(12) United States Patent
Farrell et al.

(10) Patent No.: US 9,469,274 B2
(45) Date of Patent: Oct. 18, 2016

(54) VEHICLE AND FOB COMMUNICATION ARRANGEMENT

(75) Inventors: Brian Farrell, Troy, MI (US); Patricia Kachouh, Sterling Heights, MI (US); Sanjaya K. Dash, Macomb, MI (US); Brian Marlett, Macomb, MI (US); Douglas J. King, Troy, MI (US); Stephanie Adi Zarrabi, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 804 days.

(21) Appl. No.: 12/843,841

(22) Filed: Jul. 26, 2010

(65) Prior Publication Data

US 2011/0025460 A1 Feb. 3, 2011

Related U.S. Application Data

(60) Provisional application No. 61/230,383, filed on Jul. 31, 2009.

(51) Int. Cl.
*G08B 21/00* (2006.01)
*B60R 25/00* (2013.01)

(52) U.S. Cl.
CPC .................................... *B60R 25/00* (2013.01)

(58) Field of Classification Search
CPC .................. G07C 9/00309; G07C 2009/0096; G07C 2209/06; B60R 25/24; B60R 25/00; H04L 9/3271
USPC .................... 340/5.2, 5.72; 701/2; 455/569.2
See application file for complete search history.

(56) References Cited

U.S. PATENT DOCUMENTS

| | | | |
|---|---|---|---|
| 6,570,486 B1 * | 5/2003 | Simon et al. | 340/5.1 |
| 6,603,388 B1 * | 8/2003 | Perraud et al. | 340/5.61 |
| 7,667,571 B2 * | 2/2010 | Mueller et al. | 340/5.61 |
| 2008/0109123 A1 * | 5/2008 | Kachouh et al. | 701/2 |

* cited by examiner

*Primary Examiner* — Mark Rushing

(57) ABSTRACT

An example base station assembly includes a transmitter configured to communicate a challenge signal and at least one timing signal to a plurality of fobs. The base station initiates a vehicle operation in response to at least one return signal. The return signal is communicated to the base station from at least one of the fobs in response to the timing signal.

19 Claims, 3 Drawing Sheets

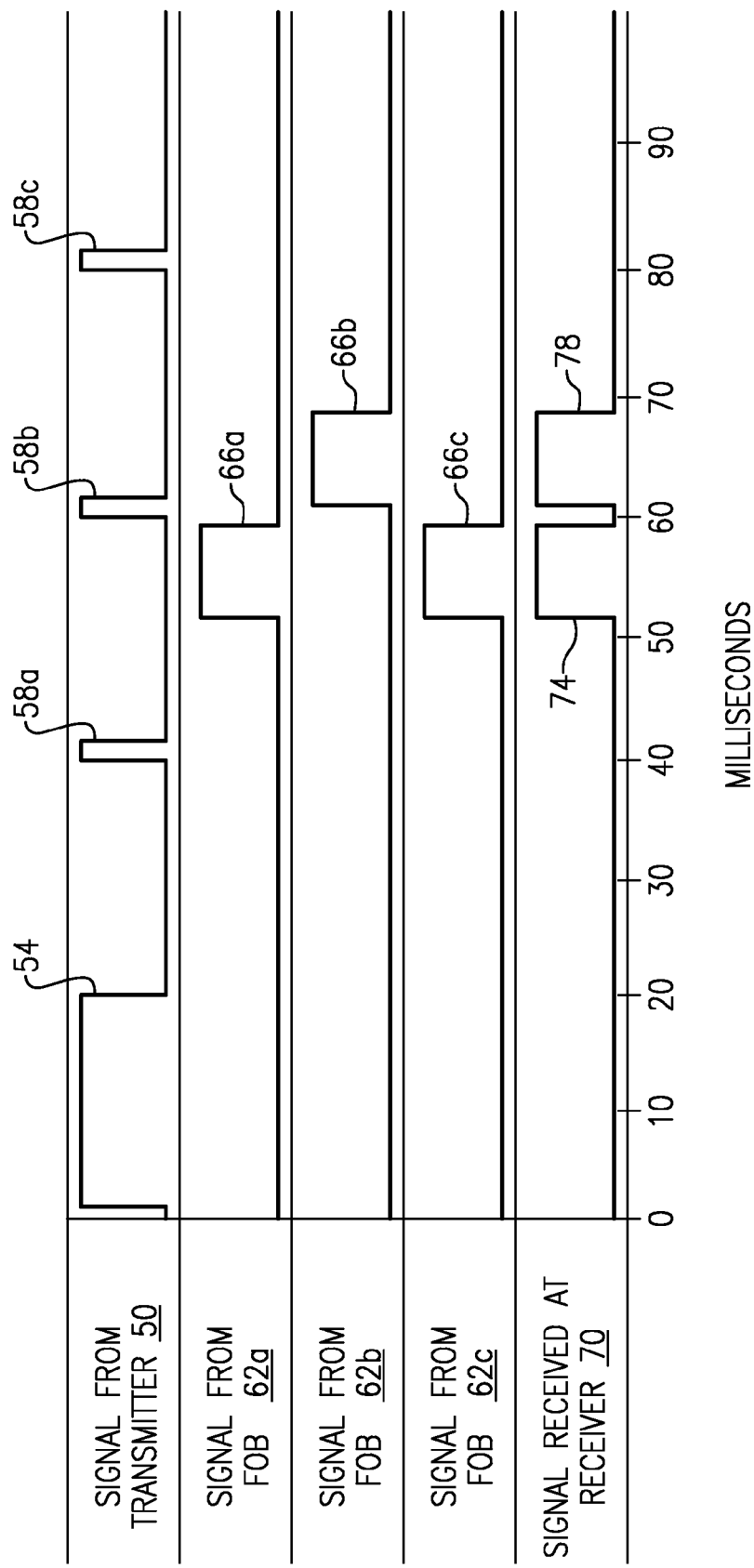

VEHICLE AND FOB COMMUNICATION ARRANGEMENT

CROSS-REFERENCE TO RELATED APPLICATIONS

This application claims priority to U.S. Provisional Patent Application Ser. No. 61/230,383, which was filed on 31 Jul. 2009 and is incorporated herein by reference.

BACKGROUND

This disclosure relates generally to communications involving a fob and, more particularly, to managing radio frequency communications between many fobs and vehicles.

Fobs used in active systems may include a button. Actuating the button sends a signal from the fob to a base station within a vehicle, for example. In passive start and entry or "PASE" systems, the fob sends a return signal to the base station in response to a challenge signal from the base station. In one example, actuating a door handle on the vehicle prompts the base station to transmit the challenge signal. In both active and passive systems, the base station initiates an action, such as unlocking the vehicle, in response to signals sent from the fob.

The base station may fail to initiate an action if the signal sent from a fob overlaps a signal sent from another fob. In a passive system, overlapping signals could occur when two users approach a vehicle at the same time. Accordingly, in typical passive systems, each of the fobs is programmed to have a unique time delay before sending their signal to the base station. For example, if a first fob and a second fob both receive a challenge signal from a base station at the same time, the first fob will send a return signal after a 10 millisecond delay and the second fob will send a return signal after a 20 millisecond delay. Delaying the return signals different amounts ensures that the first fob's return signal does not overlap the second fob's return signal.

Base stations are often configured to communicate with eight or fewer fobs. Each fob in these systems can be programmed to have a unique time delay. Some base stations, however, need to be capable of initiating actions in response to signals from hundreds, or even thousands, of fobs. Fleet vehicles may include such base stations. Assigning a unique time delay to each of these fobs is not practical due to increased system latency.

SUMMARY

An example base station assembly includes a transmitter configured to communicate a challenge signal and at least one timing signal to a plurality of fobs. The base station initiates a vehicle operation in response to at least one return signal. The return signal is communicated to the base station from at least one of the fobs in response to the timing signal.

An example vehicle communication arrangement includes a transmitter configured to communicate a challenge signal and at least one timing signal. A plurality of key fobs are each configured to communicate a return signal in response to the challenge signal and the timing signal.

An example fob communication method includes communicating a challenge signal to a plurality of key fobs and communicating a timing signal to the plurality of key fobs. The method receives a return signal from more than one of the plurality of key fobs in response to the at least one timing signal, the return signal comprising, a first return signal from one of the plurality of key fobs and a second return signal from another one of the plurality of key fobs.

These and other features of the disclosed examples can be best understood from the following specification and drawings, the following of which is a brief description.

BRIEF DESCRIPTION OF THE FIGURES

FIG. 4 is a chart showing another example of communications between fobs and a base station.

DETAILED DESCRIPTION

Figure 1:
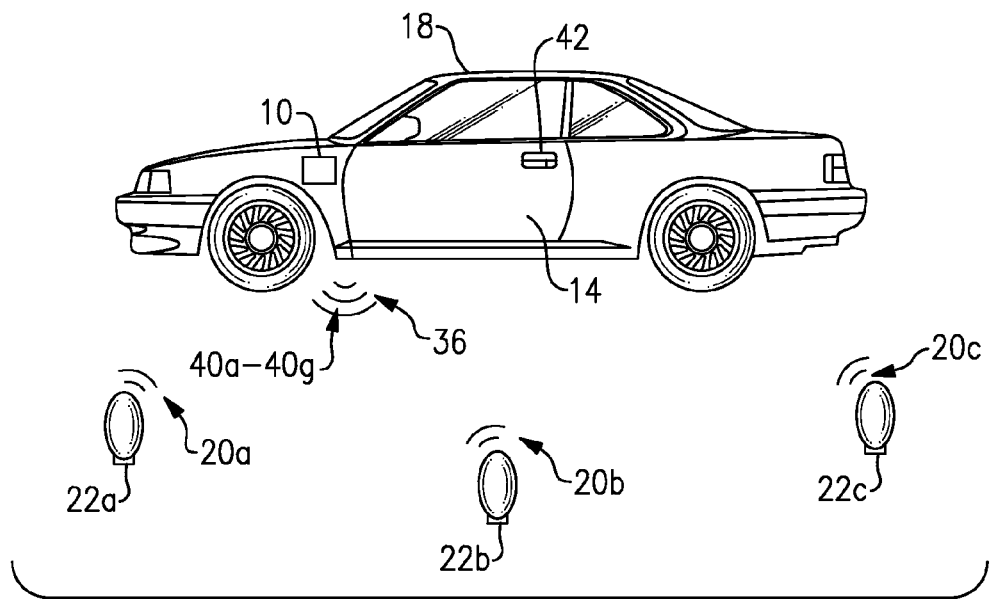
FIG. 1 shows an example base station and a plurality of fobs.
Figure 2:
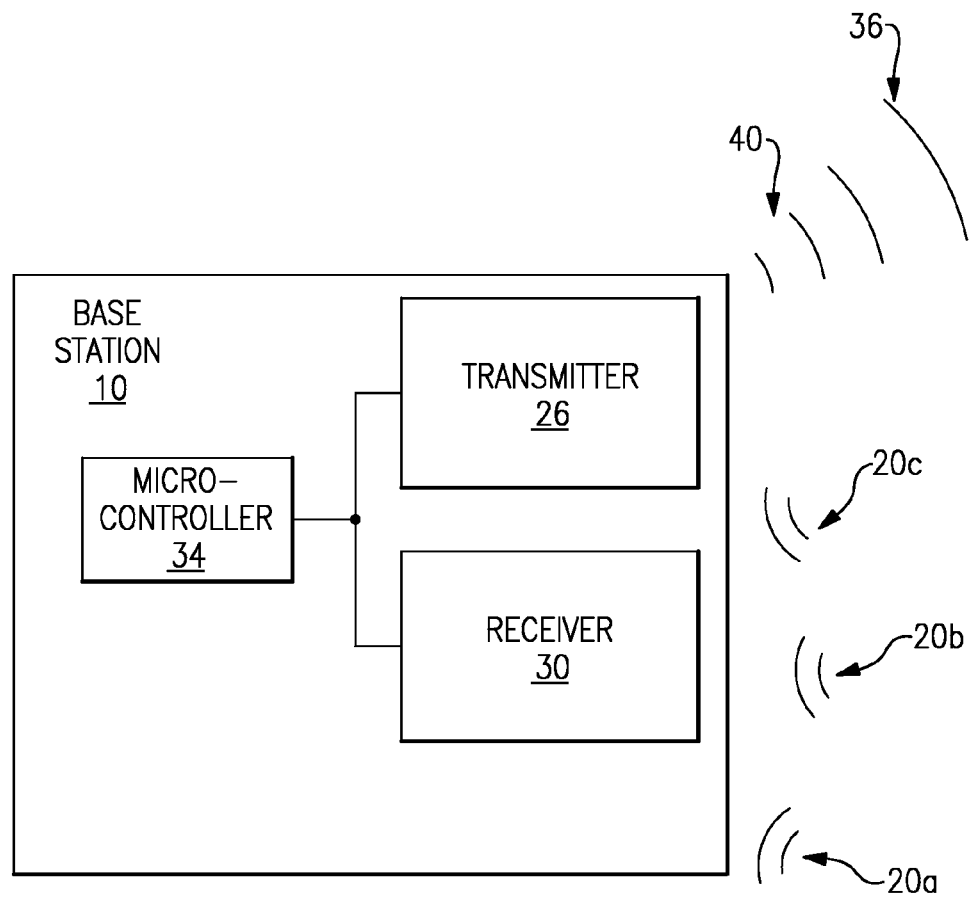
FIG. 2 shows a more detailed schematic view of FIG. 1 base station.
Figure 3:
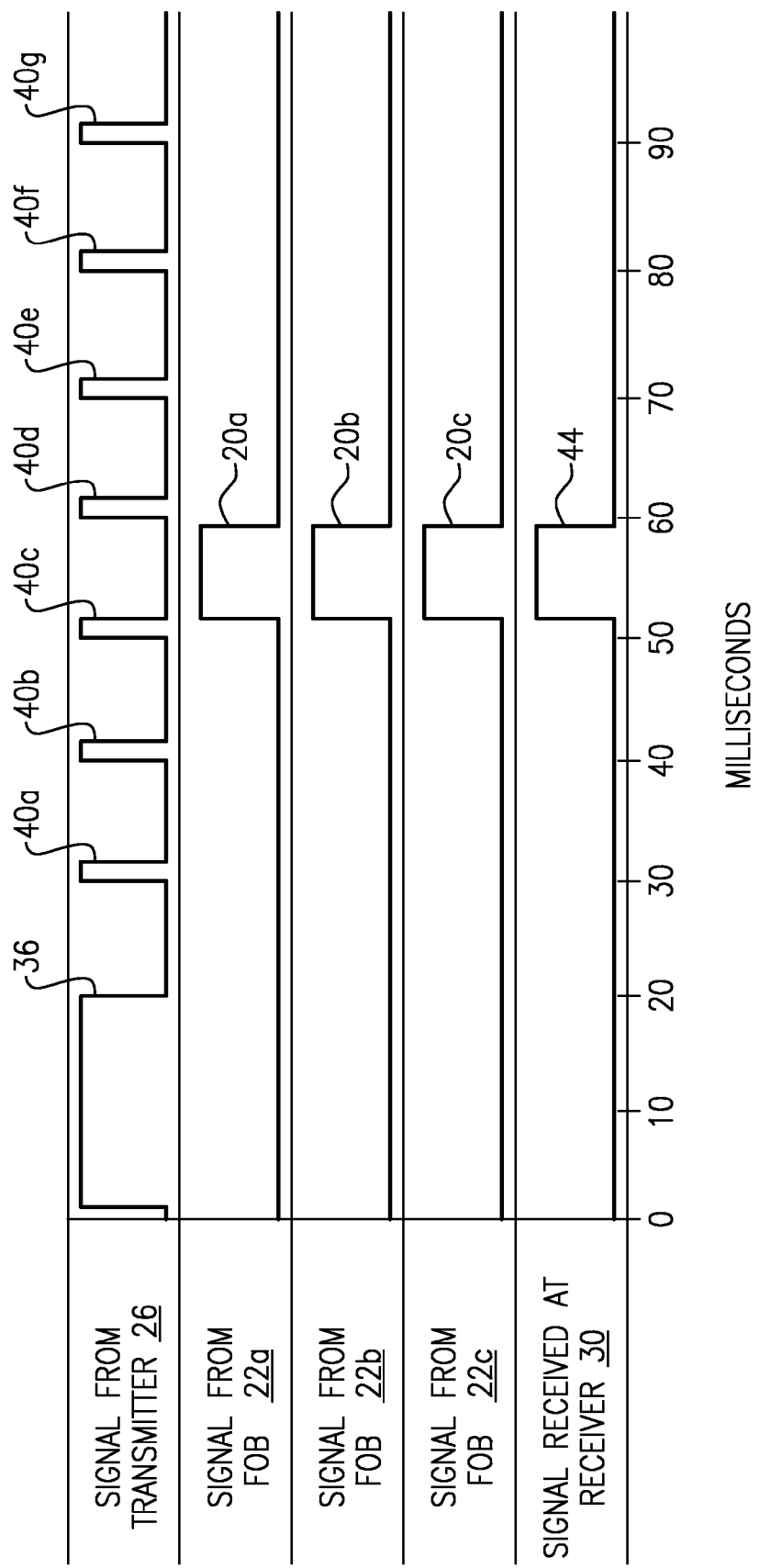
FIG. 3 is a chart showing communications between the base station and the fobs of FIG. 1.

Referring to FIGS. 1-3, an example base station 10 initiates a locking or an unlocking of a door 14 of a vehicle 18 in response to one or more return signals 20a-20c. Fobs 22a-22c, such as key fobs, each generate one of the return signals 20a-20c. In this example, the base station 10 is configured to initiate an unlocking of the door 14 after receiving the return signal 20a from the fob 22a. The base station 10 is also configured to initiate an unlocking of the door 14 after receiving both the return signals 20a and 20b from the fobs 22a and 22b, respectively, if the return signals 20a and 20b are received at the same time.

Although the example base station 10 initiates the locking or the unlocking of the door 14, another example base station may initiate other vehicle actions in response to one or more of the return signals 20a-20c, such as starting an engine of the vehicle 18.

The example base station 10 includes a transmitter 26 and a receiver 30. A microcontroller 34 communicates with the transmitter 26 and the receiver 30. The example transmitter 26 is configured to generate two types of signals: a challenge signal 36 and a timing signal 40. In another example, the transmitter 26 generates the challenge signal 36, and another transmitter (not shown) generates the timing signal 40.

The receiver 30 is configured to receive the return signals 20a-20c from the fobs 22a-22c. A person skilled in this art, and having the benefit of this disclosure, would be able to design a microcontroller 34 suitable for controlling transmission of signals from the transmitter 26 and receipt of signals from at the receiver 30.

In this example, the transmitter 26 communicates the challenge signal 36 to the fobs 22a-22c in response to a user's interaction with the vehicle 18. In one example, the user's interaction is an actuation of a door handle of the vehicle 18. The user's interaction is communicated to the microcontroller 34 in a known manner. The microcontroller 34 prompts the transmitter 26 to transmit the challenge signal 36 in response to the user's interaction. The challenge signal 36 is received by each of the fobs 22a-22c.

In this example, the fob 22a is carried in a pocket of the user that actuates the door handle 42. The other fobs 22b and 22c are carried by other users and are located within a certain proximity of the vehicle 18. Other fobs (not shown) are capable of receiving the challenge signal 36 from the base station 10. However, the other fobs are not close enough to the vehicle 18 to receive the challenge signal 36.

In this example, the base station 10 is configured to communicate with over 1,000 different fobs, but only if those fobs are within a communication range of the vehicle 18. Fobs outside the communication range do not receive the challenge signal 36 because the challenge signal 36 is not strong enough to reach those fobs.

In addition, in this example, one or more of the fobs (fob 22a for example) is configured to receive and to respond to another challenge signal from another base station in another vehicle (not shown). That is, a single fob may be configured to respond to challenge signals from more than one base station.

The challenge signal 36 sent from the transmitter 26 includes a challenge, which may include a function and a random number. The challenge signal 36 wakes up the fobs 22a-22c so that they are each able to transmit their respective return signal 20a-20c. The return signals 20a-20c each include encrypted coding in one example. A person skilled in this art, and having the benefit of this disclosure, would understand how to design a challenge signal suitable for waking the fobs 22a-22c.

After transmitting the challenge signal 36, the microcontroller 34 prompts the transmitter 26 to transmit the timing signal 40. A first timing signal 40a is transmitted about 10 milliseconds after the challenge signal 36, in this example. A second timing signal 40b is transmitted about 10 milliseconds after the transmitter 26 transmits the first timing signal 40a. An additional timing signal 40c-40g is transmitted every 10 milliseconds thereafter. In this example, the transmitter 26 transmits seven separate timing signals.

In one example, the timing signals 40a-40g are designed to contain the least amount of data possible required to wake up the fobs 22a-22c and elicit the desired response. Further, in some examples, the challenge signal 36 acts as a timing signal 40c-40g.

The example fobs 22a-22c are configured to transmit their respective return signal 20a-20c after receiving the challenge signal 36 and three timing signals 40a-40c. Notably, the example fobs 22a-22c generate and communicate their return signals 20a-20c immediately after receiving the third timing signal 40c. Thus, the return signal 20a is communicated at the same time as the return signal 20b, which is communicated at the same time as the return signal 20c.

In other examples, the fobs 22a-22c are configured to each transmit their respective return signal 20a-20c after receiving a random number of the timing signals 40a-40g. At least some of the fobs 22a-22c may be configured to retransmit another return signal. That is, some of the fobs 22a-22c may transmit one return signal in response to the third timing signal 40c and then again in response to the forth timing signal 40d.

Because the return signals 20a-20c are transmitted simultaneously and contain identical information, the microcontroller 24 interprets the return signals 20a-20c as a single effective return signal 44. There is no substantial phase difference in the example return signals 20a-20c because they are transmitted immediately after the third timing signal 40c.

In the prior art, return signals are transmitted in response to the challenge signal and some preset timing delay, which can cause undesirable timing variation or overlap in the return signals.

In this example, the microcontroller 34 initiates a vehicle operation in response to the effective return signal 44. The microcontroller 34 then unlocks the door 14, for example.

Again, each of the fobs 22a-22c are programmed to generate their respective return signals 20a-20c after receiving the challenge signal 36 and three timing signals 40a-40c.

Another fob (not shown) may be programmed to generate an additional return signal after receiving the challenge signal 36 and four timing signals 40a-40d. However, the microcontroller 24 does not interpret this additional return signal as a true return signal because the microcontroller 24 has already received the effective return signal 44. Typically, the microcontroller 24 only responds to the first received return signal after the transmitter 26 has sent the challenge signal. In this example, the effective return signal 44 is the first received return signal.

Referring to the example of FIG. 4, another example transmitter 50 is configured to communicate a challenge signal 54 and timing signals 58a-58d. The timing signal 58a is generated about 20 milliseconds after the challenge signal 54. The timing signal 58b is generated about 20 milliseconds after the timing signal 58a. The timing signal 58c is generated about 20 milliseconds after the timing signal 58b.

Notably, in some examples, the challenge signal 54 acts as a timing signal 58a-58d.

Fobs 62a-62c each generate a return signal 66a-66c in response to the challenge signal, at least one of the timing signals 58a-58c, and perhaps after some delay. More specifically, the fobs 62a and 62c generate respective return signals 66a and 66c after receiving the timing signal 58a and after a delay about 10 milliseconds. The fob 62b generates the return signal 66b immediately after the timing signal 58b.

In this example, the transmitter 50 generates fewer timing signals 58a-58c than the transmitter 26 (FIGS. 2 and 3). Even though a receiver 70 receives two return signals 66a and 66c, these return signals are identical and are interpreted as a single effective return signal 74. The receiver 70 also receives the return signal 66b at 78, but does not initiate a vehicle action in response to the return signal 66b due to the earlier received effective return signal 74.

Features of the disclosed examples include utilizing timing signals to align return signals sent from fobs. Receiving aligned signals from key fobs ensures that vehicle operations will be initiated by the return signal, rather than the vehicle failing to interpret the return signals due to misalignments, such as a phase misalignment.

The preceding description is exemplary rather than limiting in nature. Variations and modifications to the disclosed example may become apparent to those skilled in the art that do not necessarily depart from the essence of this disclosure. Thus, the scope of legal protection given to this disclosure can only be determined by studying the following claims.

We claim:

1. A base station assembly comprising:
   a transmitter portion configured to communicate a challenge signal and at least one timing signal to a plurality of fobs; and
   a base station configured to initiate a vehicle operation in response to at least one return signal, wherein at least one return signal is communicated to the base station from at least one of the plurality of fobs in response to the challenge signal and at least one timing signal, wherein the at least one return signal is at least two return signals comprising a first return signal transmitted from a first fob and a second return signal transmitted from a second fob at the same time as the first return signal, wherein the first return signal is aligned with the second return signal, and wherein the first and second return signals are identical and are interpreted as a single return signal.

2. The base station assembly of claim 1, wherein the challenge signal is separate from the at least one timing signal.

3. The base station assembly of claim 1, wherein the at least one timing signal comprises seven separate timing signals.

4. The base station assembly of claim 1, wherein the base station is configured to receive return signals from more than eight fobs.

5. The base station assembly of claim 1, wherein the vehicle operation comprises unlocking a door of the vehicle.

6. The base station assembly of claim 1, wherein at least one return signal is communicated to the base station from at least one of the plurality of fobs after receiving the challenge signal, after receiving the at least one timing signal, and after some timing delay.

7. The base station assembly of claim 1, wherein at least one return signal is communicated to the base station from at least one of the plurality of fobs after receiving the challenge signal and after receiving a random number of the at least one timing signal.

8. A vehicle communication arrangement comprising:
a transmitter portion configured to communicate a challenge signal and at least one timing signal;
a plurality of key fobs configured to communicate a return signal in response to the challenge signal and the at least one timing signal, wherein the return signal comprises a first return signal transmitted from a first fob and a second return signal transmitted from a second fob at the same time as the first return signal, wherein the first return signal is aligned with the second return signal, and wherein the first and second return signals are identical and are interpreted as a single return signal.

9. The vehicle communication arrangement of claim 8, wherein some of the key fobs are configured to communicate return signals to the transmitter portion after receiving a first number of timing signals, and some of the key fobs are configured to communicate return signals to the transmitter portion after receiving a second number of timing signals, the second number of timing signals different than the first number of timing signals.

10. The vehicle communication arrangement of claim 8, wherein the at least one timing signal comprises seven timing signals.

11. The vehicle communication arrangement of claim 8, wherein some of the key fobs communicate the return signal after receiving the challenge signal, after receiving the at least one timing signal, and after some timing delay.

12. The vehicle communication arrangement of claim 8, wherein some of the key fobs communicate the return signal after receiving the challenge signal, and after receiving a random number of the at least one timing signal.

13. A fob communication method, comprising:
communicating a challenge signal to a plurality of key fobs;
communicating at least one timing signal to the plurality of key fobs;
receiving a return signal from more than one of the plurality of key fobs in response to the at least one timing signal, the return signal comprising, a first return signal from one of the plurality of key fobs and a second return signal from another one of the plurality of key fobs, wherein the first return signal is aligned with the second return signal, and wherein the first and second return signals are identical and are interpreted as a single return signal.

14. The vehicle communication method of claim 13, wherein a phase of the first return signal has no substantial phase difference from a phase of the second return signal.

15. The vehicle communication method of claim 13, wherein the challenge signal is communicated to the plurality of key fobs separately from the at least one timing signal.

16. The vehicle communication method of claim 13, wherein the at least one timing signal comprises seven separate timing signals.

17. The base station assembly of claim 1, wherein the transmitter portion receives the return signal from more than one of the plurality of fobs at the same time.

18. The vehicle communication arrangement of claim 8, wherein each of the plurality of key fobs responds to the at least one timing signal.

19. The vehicle communication method of claim 13, wherein the first return signal and the second return signal are received at the same time.

* * * * *